July 21, 1942.    G. CAMILLI ET AL    2,290,671
INSULATED CONDUCTING MEMBER AND METHOD OF APPLYING THE INSULATION
Filed March 26, 1940    2 Sheets-Sheet 1

Inventors:
Guglielmo Camilli,
Raymond J. Hemphill,
Harold S. Endicott,
by Harry E. Dunham
Their Attorney.

July 21, 1942. G. CAMILLI ET AL 2,290,671
INSULATED CONDUCTING MEMBER AND METHOD OF APPLYING THE INSULATION
Filed March 26, 1940  2 Sheets-Sheet 2
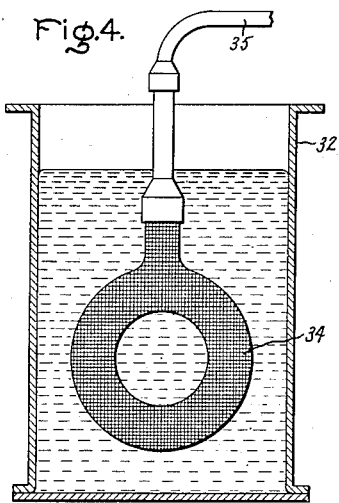
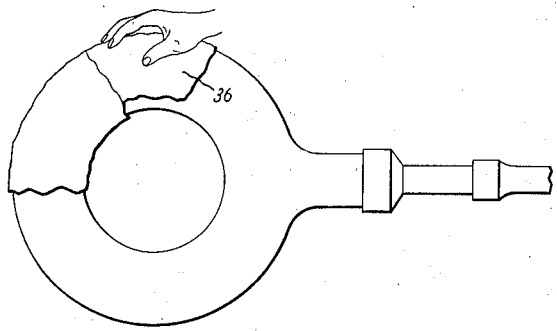
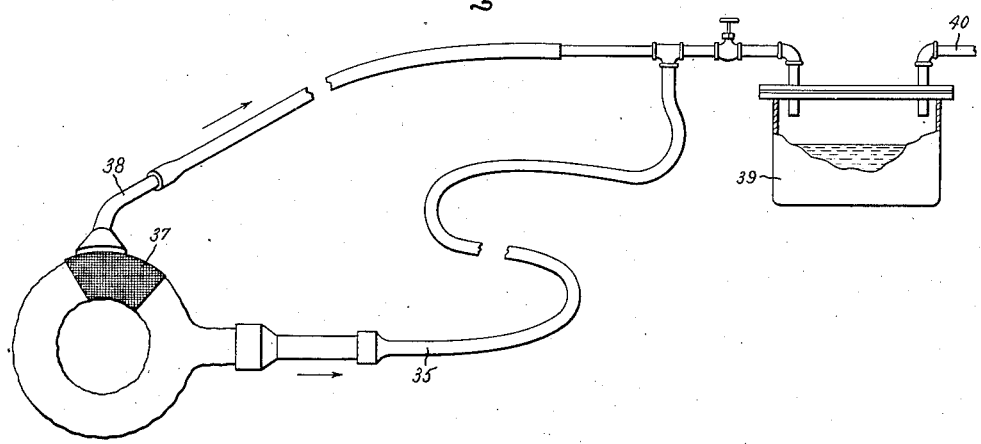
Inventors:
Guglielmo Camilli,
Raymond J. Hemphill,
Harold S. Endicott,
by Harry E. Dunham
Their Attorney.

Patented July 21, 1942

2,290,671

UNITED STATES PATENT OFFICE 2,290,671

INSULATED CONDUCTING MEMBER AND METHOD OF APPLYING THE INSULATION

Guglielmo Camilli, Raymond J. Hemphill, and Harold S. Endicott, Pittsfield, Mass., assignor to General Electric Company, a corporation of New York Application March 26, 1940, Serial No. 326,042

12 Claims. (Cl. 175—21)

This invention relates to electrical insulation and more particularly to an improved method of applying an insulating material to an electrically conducting article and to the article which is so insulated.

Our improved method relates to the insulating of articles, and has particular application as an improved method of applying insulation to an electrically conducting article, such as a coil member. Heretofore, it has been common practice when applying high voltage insulation to some coils to apply a suitable tape, such as crepe paper, by taping the coil by hand. Such a procedure is relatively costly in view of the time it takes to wrap the tape. For example, if an annular high voltage transformer winding is wrapped with suitable taping, such as to the thickness of about four inches, approximately eighty man hours are consumed. However, with our improved method an equal thickness of insulation with similar or better dielectric characteristics may be applied in a relatively short time.

It is, therefore, an object of our invention to provide an improved method for insulating an electrically conducting member with a suitable insulation which will have a high dielectric strength per unit of thickness.

Another object of our invention is to provide a new and improved insulation for a conducting member which will have a relatively high and uniformly constant dielectric strength and which may be economically applied. A further object of our invention is to provide an improved method of insulating a winding for electrical apparatus.

A still further object of our invention is to provide an improved insulated coil winding for an electric induction apparatus.

The invention will be better understood from the following description taken in connection with the accompanying drawings and its scope will be pointed out in the appended claims.

Figure 1:
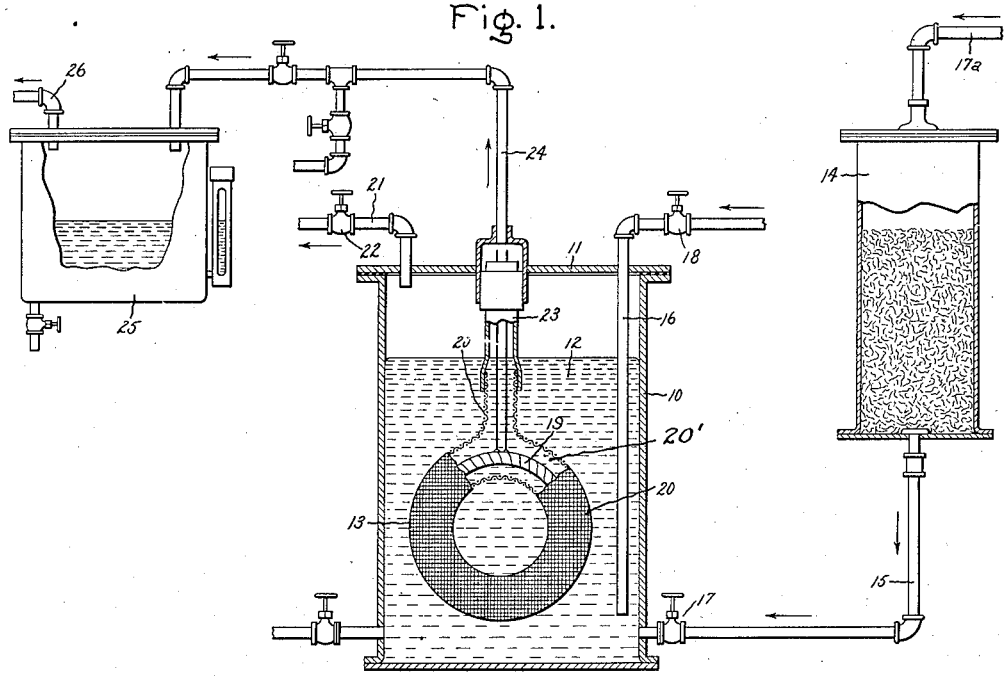
Figure 2:
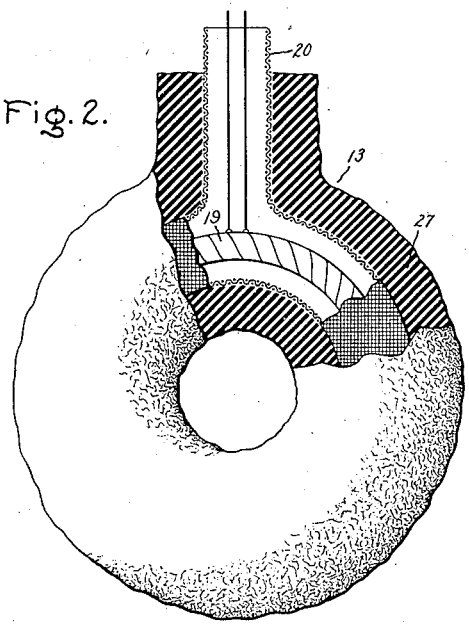
Figure 3:
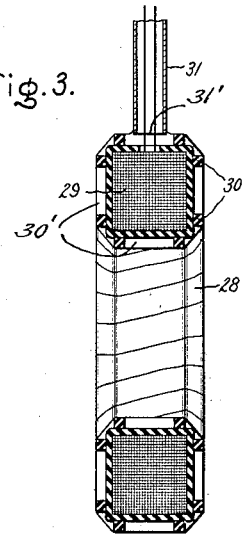

In the drawings Fig. 1 diagrammatically illustrates an apparatus for carrying out our improved method; Fig. 2 is a side elevation, in partial section, of a high voltage transformer winding covered with our improved insulation; Fig. 3 is a sectional side elevation of a transformer winding showing a winding before our improved insulation has been applied; Fig. 4 diagrammatically illustrates another apparatus for carrying out our improved method; and Figs. 5 and 6 diagrammatically illustrate a modification of our method. In the arrangements illustrated in the drawings we hydraulically apply the insulation to the electrically conducting article which is to be covered. In other words, the material which is to be coated on the article is suitably beaten or broken into finely divided particles of proper size and then mixed with any suitable liquid, such as water. The article to be insulated may be perforated or a suitable screening or permeable material may be placed around the article. The perforations or screening is necessary in order to allow the liquid adjacent to the outside surface of the perforated member or screen to pass through the perforations and deposit its suspension on the outside surface of the member when a difference of pressure between the liquid inside the perforated member or screen and the liquid surrounding the perforated member or screen is created. It will be seen, therefore, that when this difference of pressure is created in the direction of lowering the pressure inside the screening or perforated member relative to the pressure of the liquid outside the screening, that such a condition will cause the liquid outside to pass through the perforations or screening. If this movement of the liquid takes place at a sufficient rate, the liquid passing through the perforations will deposit its suspension on the outside surface thereof. In this manner we may hydraulically apply insulation to any suitable member such as a coil, it being only necessary to use material which when beaten will have particles or fibres of sufficiently large size so that they will not pass through the screen with the liquid.

Referring to the drawings, in Fig. 1 we have illustrated an apparatus for carrying out our improved method. However, it is to be understood that any other suitable apparatus may be employed. The apparatus includes a tank 10 which is provided with a pressure-tight cover 11. In this tank is placed a suitable fluid, such as a liquid 12 which has suspended therein the material which is to be coated on an article 13. Any suitable insulating material may be used, it only being necessary to use one which when beaten will have such characteristics that it will not pass in appreciable amounts through a suitable perforated or screen member. Examples of suitable materials are mica and such fibrous materials as paper and asbestos. However, it is to be understood that other materials which may be broken into particles or fibres or bits of proper size may be also applied according to our improved method. When our method is used in insulating a high voltage coil, we have found that a cellulosic material, such as paper, and particularly kraft paper, produces an efficient insulation. Such paper ordinarily comes from the mills in thick sheets so it is necessary to get the paper in proper condition so that it may be applied hydraulically. The paper is, therefore, broken into particles or beaten so that it becomes a mass of fibrous material which may be mixed with a liquid. When using paper, a suitable liquid is water. In order to thoroughly hydrate the paper it may be beaten while in water so that it becomes a wet mash. When a material such as mica is used the liquid vehicle employed for hydraulically applying the mica may be a thin glue-like liquid such as glyptal. This paper pulp is then placed into a tank 14 which leads to the tank 10 through a piping system 15. In order to suitably proportion the amount of liquid with the pulp, we provide an intake 16 for the liquid. In order to obtain the desired amount of mixture 12 of liquid and paper pulp in the tank 10, a measured amount of pulp is caused to flow into the tank 10 by opening a valve member 17 and forcing it in under air or water pressure which may be applied through the pipe 17a. Water is then allowed to flow into the tank 10 by opening a control valve 18. Any suitable proportion of paper pulp to water may be used. However, we have found that when using a screen of ordinary size, that is, about 200 mesh, suitable proportions are 1 part of paper pulp by weight to about 99 parts of water.

Any electrically conducting article may be insulated with our improved method, and in Fig. 1 we have illustrated a high voltage coil winding of an electric induction apparatus, such as a transformer, as the article 13. In order to provide a base on which our improved insulation may be deposited the transformer winding with turns 19 is covered with a permeable envelope or screen of any suitable material, such as an annular perforated metallic member 20 which has at least a portion spaced from the winding or from a portion of the turns 19 to provide a suitable fluid channel arrangement 20'. This perforated member, in addition to providing a surface on which the suspension from the water may be deposited, also provides if conductive other desirable features, such as the screening of the transformer winding electrostatically. Such features of the metallic member are described in a copending application of Guglielmo Camilli, Serial No. 287,032, filed July 28, 1939, and granted as Patent 2,280,625, and which is assigned to the same assignee as our invention.

In order to produce a difference in pressure between the liquid inside the screen 20 and that surrounding the screen member water pressure is applied to the tank 10 through the pipe 16. Thus, if the valve 18 in the pipe 16 is opened, the pressure outside the screen member 20 will tend to increase over that inside. The pipe 21 and valve 22 are used to draw off excess water. In order to further decrease the pressure inside the screen over that obtaining outside we provide a suitable pumping arrangement which may be connected to the screen member 20 through a pipe member 23. This pipe member is in turn connected through a pipe system 24 to a sump 25, the sump in turn being connected to a pump through a pipe 26. Thus, it will be seen that if water pressure is applied by opening the valve 18 and the pump attached to the pipe 26 is operated, the water adjacent the screen member 20 will rapidly flow through the screen and pass out through the channel arrangement 20' and pipe 24. During this movement suspension in the water will be deposited on the outside surface of the screen or perforated member 20. When depositing cellulosic insulating material, such as kraft paper on a transformer coil as illustrated in Fig. 1, we have found that a difference of pressure between the inside and outside the screen of about 200 pounds per square inch will produce a suitable coating in a relatively short time. During the coating operation since water is constantly entering and leaving the tank 10, I have found that a proper proportion of liquid to pulp may be kept by constantly introducing pulp into the tank 10 through the pipe 17 at a suitable rate. Thus, the coating is hydraulically applied to the high voltage winding. This deposition of material will continue until the flow of water stops. The amount of material which is built up may, of course, be varied by varying the degree of heating of the fibers of paper pulp in relation to the size of the perforations and relating these factors to the amount of pressure differential which is built up between inside and outside the screening.

In Fig. 2 we have illustrated the high voltage winding 13 after an insulating coating 27 of paper pulp has been applied by our improved method. The perforated member 20, which in this particular application is metallic, may be suitably spaced from the high voltage winding 19 by an arrangement which includes protrusions, or bar members, which extend from the inside surface of the screen 20 in a radial direction. As we have stated, when applying this insulation to the high voltage winding of an instrument transformer of the type shown in Fig. 2, it is desirable to use a metallic screen. However, in some other application of our improved method the metallic screen may not be desired. We have, therefore, illustrated in Fig. 3 a non-metallic screen, such as a cloth screening 28 which is wrapped around a conducting member 29 and suitably spaced therefrom by spacers 30 to form a suitable fluid conducting arrangement, such as a plurality of channels 30' between the conducting member and the screen. The cloth screen is in turn adapted to be connected with a pipe 31 through a suitable passage 31' formed by an opening or by perforations in the screen, which passage connects with the channels 30'. The pipe 31 may lead to any suitable pump such as that described in relation to Fig. 1. When such a member is placed into the apparatus illustrated in Fig. 1, the coating will be deposited on the screen 28 according to the method as has been described above.

In the description of our method referred to above, we have created a pressure differential between the inside and outside of the screen member by means of using both a source of pressure and a source of vacuum. However, it is to be assumed that either one of these two sources may be used separately. In Fig. 4, we have illustrated a tank 32 into which is placed water with a suitable amount of material suspended therein. The member 34 which is desired to be coated is placed or immersed in the fluid in the tank and is connected to a vacuum pump through a pipe 35. When the pump is connected to the pipe 35 water will be drawn therethrough and the material will be deposited on the outside of the screen member. A further coating may be built up by applying by hand a portion of hydrated material 36 as is shown in Fig. 5. Then, according to Fig. 6, a screen 37 is placed over the hydrated portion of material in order to allow the water to be removed from the material so as to cause it to uniformly surround the article to be coated. In order to accomplish this, the nozzle 38 is placed over the screen 37, and to further increase the suction effect the nozzle and the pipe 35 are connected to a pump through the sump 39 and the pipe 40. Thus, it will be seen that the water will be sucked either out through the nozzle 38 or into the inside of the screening 20 and out through the pipe 35. The method according to Figs. 5 and 6 of applying a hydrated material by hand may, of course, be used independently of the vacuum method shown in Fig. 4.

After the coil has been insulated, the article may be dried so as to remove all the water from the insulation. When drying the insulated coil, it is desirable to so heat it that the coating shrinks evenly and closely fits the coil so that no voids will be left therein. This may be accomplished by drying the coil very slowly in an oven. Another method of drying the coil includes placing in a high frequency oven or passing current through the article. When the coil is so dried, it drys from the inside out. Thus the insulation shrinks and closely fits the coil without forming voids. This is a very desirable characteristic of insulation.

We have found that when an electrically conducting article, such as the high voltage winding 13, is insulated by our hydraulic method a compact structure is formed in which an even amount is built up all around. In addition, we have found that the dielectric constant is approximately the same for all parts of the insulation built up, and we have also found that the dielectric constant of the paper applied according to our improved method compares very favorably with that of an equal amount of crepe paper applied by the much more tedious method of taping. This is because the coating deposited by the improved method has a laminated structure.

In view of the foregoing, it will be seen that we have provided a new and improved method of insulating an electrically conducting article, such as a high voltage transformer winding, which is simple and economical to practice. Such a method may be employed whenever it is desired to insulate a coil with a material which may be suspended in a liquid and which will have such characteristics that it will not pass in appreciable amounts through the perforated member or screen which surrounds the article to be coated. Thus, we have found that it is possible to greatly decrease the amount of effort entailed in suitably insulating the high voltage winding of a transformer so that it will withstand high voltages up to about 1000 kilovolts.

While we have shown and described particular embodiments of our invention, it will be obvious to those skilled in the art that various changes and modifications can be made therein without departing from the invention, and, therefore, it is aimed in the appended claims to cover all such changes and modifications as fall within the true spirit and scope of the invention.

What we claim as new and desire to secure by Letters Patent of the United States, is:

1. In a method of producing an insulated coil winding member for an electric induction apparatus, the steps of surrounding the member with a permeable envelope and spacing at least a portion of the envelope from the member to form a fluid channel, immersing the member and envelope in a liquid having finely divided particles of insulating material suspended therein, and creating a higher pressure in the liquid surrounding the envelope than that in the fluid channel inside the envelope so that the liquid will pass through the envelope and deposit its suspension on the outside thereof.

2. The method of insulating a coil winding for an electric induction apparatus with an insulating material which includes beating the insulating material into bits, introducing the beaten material into a liquid, surrounding the coil with a screen, immersing the coil and screen in the liquid with the insulating suspension, and creating a difference in the relative pressures inside and outside the screen so that the liquid adjacent the outside surface of the screen will pass therethrough and deposit its suspension on the outside surface of the screen.

3. The method of insulating a coil winding for an electric induction apparatus with an insulation which includes surrounding the coil with a screen, immersing the coil in a liquid having finely divided bits of the insulating material suspended therein, creating a difference in the relative pressures inside and outside the screen in order that the outside liquid pressure is higher so that the liquid adjacent the outside surface of the screen will pass therethrough and deposit its suspension on the outside surface of the screen, and removing the insulated coil from the liquid and drying slowly so as to remove substantially all the liquid therefrom and to allow the insulation to evenly shrink around the coil.

4. A method of insulating a coil winding member for an electric induction apparatus with an insulation which includes surrounding the member with a screen, immersing the member in a liquid having finely divided bits of the insulating material suspended therein, creating a difference in relative pressures inside and outside the screen in order that the outside liquid pressure is higher so that the liquid adjacent the outside surface of the screen will pass therethrough and deposit its suspension on the outside surfaces of the screen, and removing the insulated coil from the liquid and drying the insulation from the inside out so as to allow the insulation to evenly shrink around the coil.

5. The method of insulating a high voltage coil winding for an electric induction apparatus with paper which includes surrounding the coil with a metallic screen, immersing the coil in water having hydrated paper pulp suspended therein, and creating a difference in the relative pressures inside and outside the screen in order that the outside water pressure is higher so that the liquid adjacent the outside surface of the screen will pass therethrough and deposit its suspension of paper pulp on the outside surface of the screen.

6. The method of insulating a coil winding for an electric induction apparatus with paper which includes surrounding the coil with a cloth screen, immersing the coil in water having hydrated paper pulp suspended therein, and creating a difference in the relative pressures inside and outside the screen in order that the outside water pressure is higher so that the liquid adjacent the outside surface of the screen will pass therethrough and deposit its suspension of paper pulp on the outside surface of the screen.

7. The method of insulating an electrically conducting member with a fibrous material which includes surrounding the member with a permeable member, placing a portion of hydrated fibrous material on the permeable member, placing a screen over the fibrous material, placing a vacuum nozzle over the screen, and causing a lowering of the pressures inside the vacuum nozzle and inside the permeable member so as to remove the liquid from the material and cause it to adhere to the permeable member.

8. The method of insulating a coil with paper which includes surrounding the coil with a screen, immersing the member in a liquid having finely divided fibres of paper pulp suspended therein, causing the pressure inside the screen to be lower than that of the surrounding liquid in order to cause the liquid adjacent the outside surface of the member to pass through the screen and deposit its suspension on the outside thereof, removing the member from the liquid, placing a portion of hydrated paper pulp on the so coated coil, placing a screen over the hydrated fibrous material, placing a vacuum nozzle over the screen, and causing a lowering of the pressures inside the vacuum nozzle and inside the screen so as to remove the water from the hydrated fibrous material and cause it to adhere to the coil.

9. An insulated coil winding for an electric induction apparatus including a plurality of turns, a screen surrounding said turns, means spacing said screen from said turns in order to form a plurality of channels between said turns and said screen, means providing a fluid passage connected to said channels, and a hydraulically applied cellulosic insulating material surrounding and closely fitting said screen.

10. The method of insulating a coil winding member with a fibrous material which includes surrounding the member with a permeable member, placing a portion of hydrated fibrous material on the permeable member, placing a screen over the fibrous material, placing a vacuum nozzle over the screen, and causing lowering of the pressure inside the vacuum nozzle so as to remove the liquid from the material and cause it to adhere to the permeable member.

11. The method of insulating a coil winding member with paper which includes surrounding the coil with a screen, immersing the member in a liquid having finely divided fibers of paper pulp suspended therein, creating a difference of pressure between the inside of the screen and that in the liquid surrounding the screen so that liquid will pass through the screen and deposit its suspension on the outside thereof, removing the member from the liquid, placing a portion of hydrated paper pulp on the so coated coil, placing a screen over the hydrated fibrous material, placing a vacuum nozzle over the screen, and causing a lowering of the pressure inside the vacuum nozzle so as to remove the water from the hydrated fibrous material and cause it to adhere to the coil.

12. An insulated coil winding for an electric induction apparatus including a conductor turn, screen means permeable to a fluid surrounding said conductor turn, means spacing at least a portion of said screen from said turn in order to form a fluid channel between said turn and said screen, and a hydraulically applied insulating material surrounding and closely fitting said screen, said screen having a fluid passage connected to said channel through which a fluid may pass during application of said hydraulically applied insulating material.

GUGLIELMO CAMILLI.
RAYMOND J. HEMPHILL.
HAROLD S. ENDICOTT.